United States Patent [19]

Hart

[11] 4,208,989

[45] Jun. 24, 1980

[54] WATER VAPOR INJECTION SYSTEM

[76] Inventor: Radford H. Hart, Apex Post Office, Apex, N.C. 27502

[21] Appl. No.: 969,881

[22] Filed: Dec. 15, 1978

Related U.S. Application Data

[60] Division of Ser. No. 868,518, Jan. 11, 1978, Pat. No. 4,141,323, and a continuation-in-part of Ser. No. 440,550, Feb. 7, 1974, abandoned.

[51] Int. Cl.² ............................................. F02M 25/02
[52] U.S. Cl. ............................... 123/25 B; 123/25 M; 261/18 A; 261/DIG. 66
[58] Field of Search ................ 123/25 B, 25 D, 25 P, 123/25 M, 25 H, 25 A, 25 R, 25 L; 261/18 A, DIG. 66

[56] References Cited

U.S. PATENT DOCUMENTS

| | | | |
|---|---|---|---|
| 1,181,036 | 4/1916 | Reuter | 123/25 B |
| 1,291,718 | 1/1919 | Baker | 123/25 B |
| 1,291,927 | 1/1919 | Kline | 123/25 B |
| 1,551,511 | 8/1925 | Futcher | 123/25 B |
| 1,739,073 | 12/1929 | Johnson | 123/25 B |
| 1,739,749 | 12/1929 | Cabell | 123/25 B |
| 2,099,802 | 11/1937 | Ewing | 123/25 B |
| 2,122,414 | 7/1938 | Foster | 123/25 A |
| 2,216,722 | 10/1940 | Denson | 123/25 A |
| 3,044,453 | 7/1962 | Hoffmann | 123/25 B |

*Primary Examiner*—Ira S. Lazarus

*Attorney, Agent, or Firm*—Mills & Coats

[57] ABSTRACT

The present invention relates to a water vapor injection system for introducing artificially high humidity air into the carburetor of an internal combustion engine. Once delivered to the carburetor, the high humidity or moisture-laden air mixes with the air-fuel mixture normally passing from the carburetor into the combustion chambers to increase the combustion efficiency of the internal combustion engine.

A forced air system is generated by an air injection pump, and this forced air is heated to alter its vaporization characteristics prior to being circulated through a water filled container. As the heated air is exposed to the water within the container, the air increases in moisture content as the heat associated with the air tends to vaporize water about the interface between respective bubbles and the surrounding water. Because of the continuous force of the pump, the high moisture air realized from passing the air through the water filled container is then forced from the container into the immediate area of the top of the carburetor. There the moisture-laden air generated by the water vapor injection system is mixed with the normally injected air supply and, accordingly, the water content of the final air-fuel mixture is increased which, expressed generally, significantly increases the efficiency of the combustion process within the internal combustion engine.

10 Claims, 5 Drawing Figures

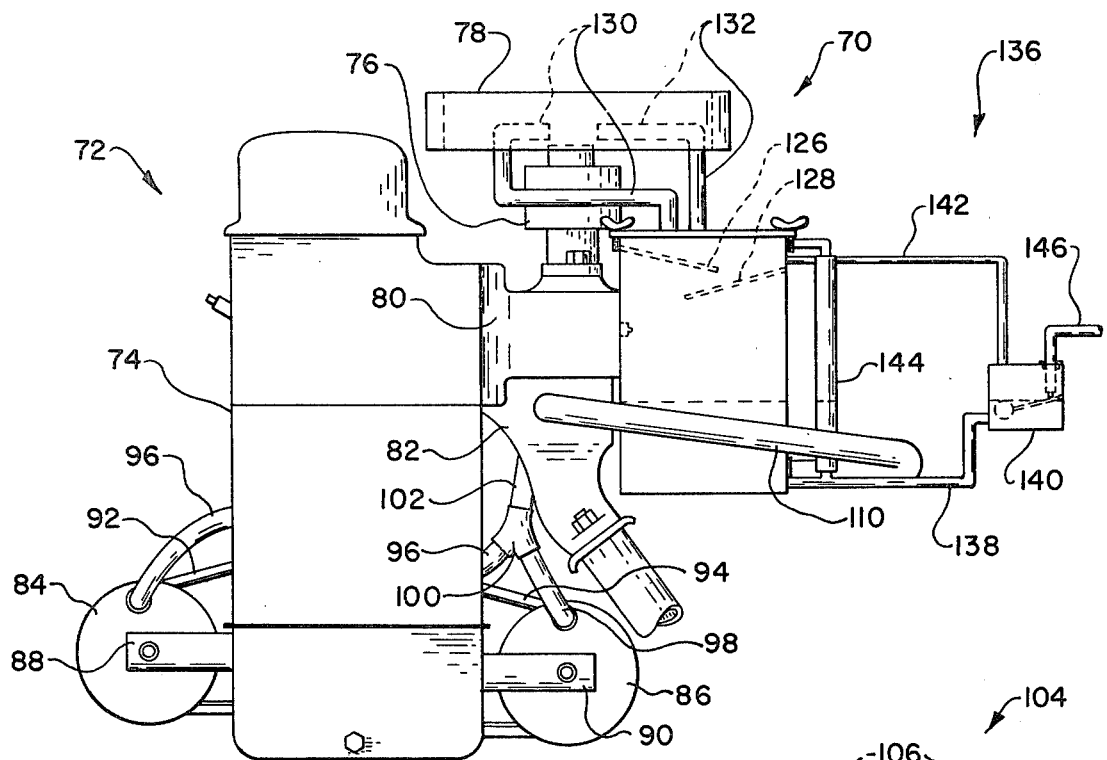
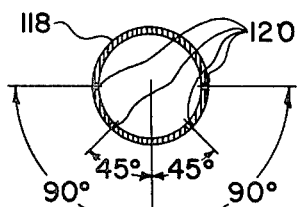
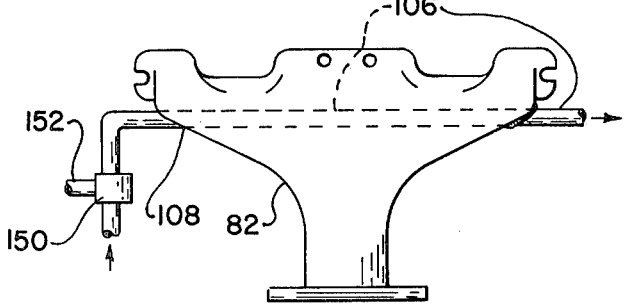
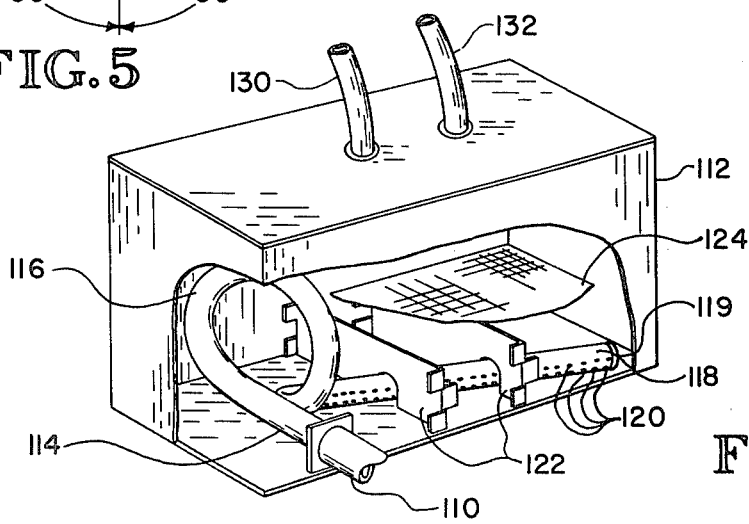

WATER VAPOR INJECTION SYSTEM

This is a division of application Ser. No. 868,518, filed Jan. 11, 1978, now U.S. Pat. No. 4,141,323, and a continuation-in-part Application of U.S. pat. application Ser. No. 440,550, abandoned filed Feb. 7, 1974, and entitled "WATER VAPOR INJECTION SYSTEM".

The present invention relates to a water vapor injection system for an internal combustion engine, and more particularly to a water vapor injection system wherein a system of forced air is generated and heated prior to being exposed to the source of water.

BACKGROUND OF THE INVENTION

It is well appreciated that inefficient combustion within the cylinders of an internal combustion engine gives rise to a serious air pollution problem as well as significantly affecting the overall efficiency and performance of the engine. More specifically, inefficient combustion often means that a significant quality of the fuel mixture within a particular cylinder is not totally burned and is, therefore, exhausted from the engine into the air. Such unburned compounds are thus emitted to the air. While these compounds are harmful from a pollution standpoint, they also include valuable energy that is wasted to the air.

In terms of performance, these exhausted gases, as noted above, do include useable energy that is not captured and utilized during the combustion process. Thus, if the unused energy associated with the normally exhausted gases could be efficiently harnassed during the combustion process, it obviously follows that the engine would be more efficient and require less fuel for a given distance of travel.

Federal legislation and standards have in the past few years required automotive makers to implement various anti-pollution measures on automobiles produced. While it is recognized that these anti-pollution measures have, in most cases, reduced pollution from the automobile, it likewise has been seen that these same anti-pollution measures have generally reduced the efficiency of the automobile engine and have resulted in reduced fuel economy, thereby giving rise to an increased fuel requirement. All of this has led the consumer to believe that any device that is installed on an engine to reduce pollution has to reduce the efficiency of that same engine and will decrease the efficient use of gasoline.

More recently the presence of the much talked about "energy crisis" has presented a dilemma to the public as well as the automotive engineers. This dilemma revolves around the question of the delicate balance between controlling the environment on one hand, and the conservation of fuel on the other hand, both of which are of vital concern.

SUMMARY OF THE INVENTION

The water vapor injection system of the present invention has been devised to be used in conjunction with an internal combustion engine, and more particularly, presents a device that is both beneficial in reducing air pollution emitted from the engine and for increasing the fuel economy of the automobile powered thereby. Besides negating the common thinking that an emissions device naturally results in decreased fuel economy, the water vapor injection system of the present invention alters the combustion process within the engine, and thereby gives rise to a smooth, clean-burning, and efficiently operating engine.

More particularly, the water vapor injection system of either embodiment of the present invention basically comprises air generating means such as an air injection pump (smog pump) driven by the engine and adapted to generate a system of forced air. The air generated by the air injection pump is preheated by forcing the same around or in close proximity to the exhaust manifold of the engine. After the forced air is preheated, it is directed into a reservoir containing a volume of water. The fact that air is substantially preheated prior to entering the water reservoir enables the heated air to vaporize portions of the surrounding water. Consequently, the air leaving the water reservoir is of a greater moisture content than the preheated air entering the same water reservoir.

The moisture-laden air leaving the water reservoir is channeled to a position in close proximity to the top of the carburetor attached to the internal combustion engine and mixes with the air-fuel mixture passing therethrough. In order to divert or effectively stop the flow of moistened air to the carburetor, control means is provided as a part of the system to effectively stop the flow of moistened air into the carburetor. This enables the engine to utilize only normally humidified air for a short time prior to shut-down, which tends to purge and clear the engine of any abnormally high moisture accumulations therein to avoid a severe oxidation (rusting) problem within the confines of the combustion chamber.

It is, therefore, an object of the present invention to provide a water vapor injection system for an internal combustion engine that increases the combustion efficiency of the engine.

A further object of the present invention resides in the provisions of a water vapor injection system for an internal combustion engine wherein the moistened air of the water vapor injection system mixes with the air-fuel mixture within the cylinders of the engine to (1) reduce the undesirable gases emitted from the engine, (2) increase the combustion efficiency within the engine which, in turn, reduces the fuel requirements, (3) slowing and smoothing of the combustion process which gives rise to a smoother operating engine, and (4) reducing the combustion temperature.

Still a further object of the present invention is to provide a highly efficient water vapor injection system wherein forced air is preheated to alter its water vaporization characteristics and increase its water holding capacity prior to being routed through the liquid water.

A more particular object of the present invention resides in the provision of a water vapor injection system having an air injection pump means adapted to generate a system of forced air and route the same through a reservoir containing a volume of water wherein the water vapor injection system includes an elongated air inlet tube extending between the air pump means and water reservoir and wherein the air inlet tube is directed closely adjacent the exhaust manifold of the engine in order to effectuate heat exchange between the manifold and air passing through the air inlet tube. Consequently, the heat associated with the exhaust manifold is conducted to the inlet air tube and thusly heats the air passing therethrough prior to entering the water reservoir.

It is also an object of the present invention to provide a water vapor injection system for an internal combustion engine wherein the water vapor is delivered to the entry point of the carburetor associated with the engine, and wherein there is provided control means for effectively stopping the flow of water vapor into the carburetor such that the engine can only receive normally humid air prior to engine shut-down to assure that the engine is purged and cleared of excess moisture.

A more specific object of the present invention relative to the efficiency of the water vapor injection system resides in the provision of a water supply wherein a substantial volume of air under moderate pressure is continuously forced through the water supply causing a foaming action therein.

A more particular object of the present invention resides in the provision of a water vapor injection system for generating a system of air and heating the air to a temperature of at least 100° C., and preferably in the range of 300° C. or more, and forcing the heated air through water to vaporize water about the interface defined between heated air and the surrounding water, and to direct the resulting water vapor into an engine.

Still a further object of the present invention is to provide a water vapor injection system of the type set forth above with the added provision of means for automatically supplying and replenishing the water in the system.

Still a further object of the present invention is to provide a water vapor injection system of the type set forth above with an efficient heat exchanger design utilizing the exhaust manifold of the engine.

Other objects and advantages of the present invention will become apparent and obvious from a study of the following description and the accompanying drawings which are merely illustrative of the present invention.

IN THE DRAWINGS

FIG. 2 is a rear elevational view of an internal combustion engine showing a second embodiment of the water vapor injection system of the present invention installed thereon.

FIG. 3 is a fragmentary side elevational view illustrating an air inlet tube of the second embodiment extending within the exhaust manifold of the engine to effectuate heat exchange between the exhaust gases and air passing through said air inlet tube.

FIG. 4 is a perspective view of a water container forming a part of said second embodiment with a side portion thereof being cut away to better illustrate the internal structure thereof.

FIG. 5 is a cross sectional view of the effervescing extension disposed internally within the water reservoir.

Figure 1:
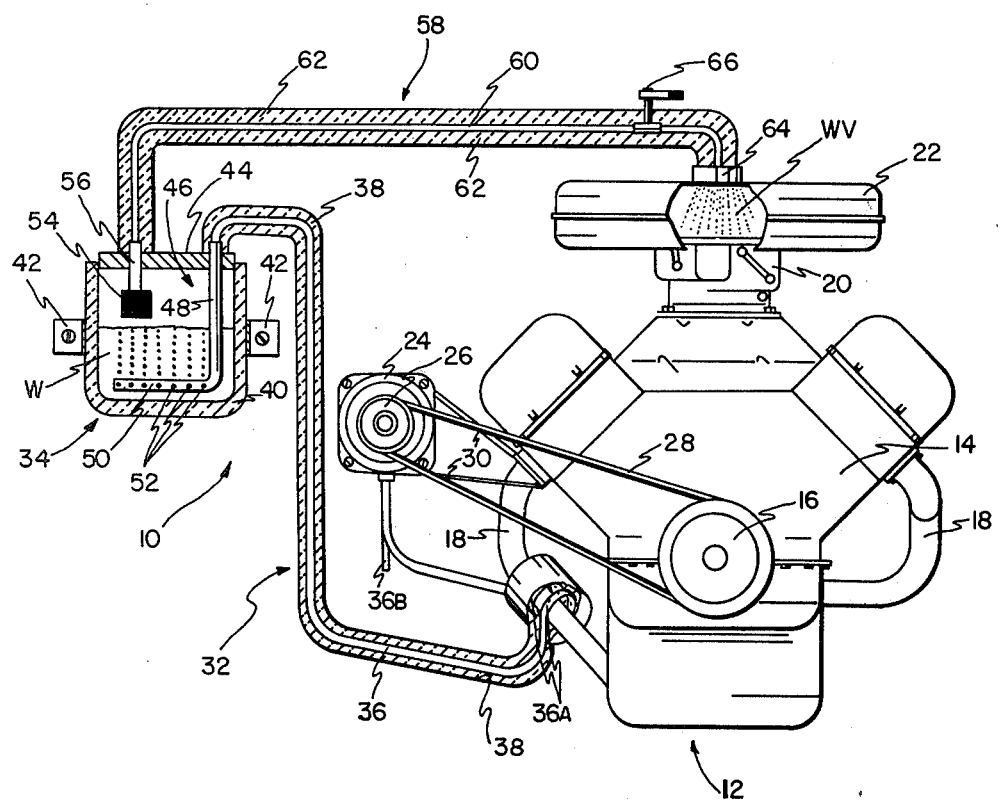
FIG. 1 is a front elevational view of an internal combustion engine showing a first embodiment of the water vapor injection system of the present invention installed thereon, portions of the water vapor system being shown in sections to better illustrate the components thereof.

With reference to the drawing and FIG. 1, a first embodiment of the water vapor injection system of the present invention is shown therein and indicated generally by the numeral 10, the water vapor injection system being shown in conjunction with an internal combustion engine indicated generally by the numeral 12.

Before proceeding with a detailed discussion of the structure and components of the water vapor injection system 10, a brief description of the internal combustion engine 12 will follow. Viewing the internal combustion engine 12 in more detail, it is seen that the same includes an engine block 14 having a conventional crankshaft, not shown, which is operative to drive a front mounted pulley 16. The engine 12, like other similar internal combustion engines, includes at least one exhaust manifold 18 that extends from the cylinder head area of the engine and which is adapted to channel exhausted gases from the engine.

Mounted atop the engine block 14 about the area commonly referred to as the intake manifold is a carburetor 20 having an air cleaner shroud 22 which contains the filter element for filtering incoming air. This concludes a brief description of the basic structure of the internal combustion engine 12 as shown, since a comprehensive, detailed study and discussion thereof is not material to the present invention, as the water vapor injection system of the present invention can be utilized on all types of similar internal combustion engines, and the structure and working relationship of the parts thereof are well known in the art.

Turning to the water vapor injection system 10, it is seen from FIG. 1 that the same comprises a smog or air injection pump 24, preferably supported from the engine block 14 by a pair of mounting brackets 30. The air injection pump 24 includes a rotatively mounted pulley 26 that is driven by a flexible V-belt 28 which is trained around pulley 16 driven by the crankshaft, not shown, of the engine 12.

The function of the smog or air injection pump 24 is to generate a system of forced air which will be utilized by the water vapor injection system of the present invention. Although the quantity of air may vary depending on specific applications, it is contemplated that pump means having an output of 12 to 25 cfm would provide a generally efficient system in most cases. The system of forced air generated by the pump 24 is channeled into an air inlet means, indicated generally at 32, which leads to the top of a water reservoir 34 which contains a volume of water W.

Viewing the air inlet means 32 in greater detail, it is seen that the same includes an elongated air channeling or conveying tube 36 (such as copper tubing) that leads from the air injection pump 24 to the top of the water reservoir 34. Surrounding the air inlet tube 36 is an insulated structure of any suitable type indicated by the numeral 38.

Between the air pump 24 and the water reservoir 34, the air inlet tube 36 is wound around a portion of the exhaust manifold 18, these windings being referred to individually by 36a. It, therefore, follows that during operation of the engine 12 heat associated with the exhaust manifold 18 is imparted to the air traveling through the air inlet tube 36 prior to the air reaching the water reservoir 34.

As will become apparent from subsequent discussion herein, the water vapor system shown herein can be closed at the outlet end thereof. To previous possible damage to the water vapor injection system and particularly to the pump 24, there is provided between the pump 24 and reservoir 34 an escape outlet 36b. The particular diameter of air escape outlet 36b is chosen relative to the air inlet tube 36 such that during normal operation the air escape outlet can be maintained "open" and there still remains a sufficient volume of air passing into the reservoir 34 to enable the system to operate as intended.

With reference to the water reservoir 34, it is noted that the same comprises a bottle type container 40 having a volume of water W contained therein. Bottle container 40 is appropriately mounted to suitable supporting structure by a pair of brackets 42. The bottle type container 40 includes an openable top 44 that is adapted to either screw on or snap onto the top of the container 40. It should be appreciated that the entire assembly, consisting of the openable top 44 is to be leakproof to allow full pressurization of the water reservoir 34.

An air disperser, indicated generally by the numeral 46, is secured onto the openable top 44 and extends downwardly therefrom to where a portion thereof extends through the water W and lies adjacent to the bottom portion of the bottle container 40. Viewing the air disperser 46 in closer detail, the same includes a vertical leg 48 that extends through the openable top 44 and is communicatively connected to the air inlet tube 46 for receiving the preheated forced air therefrom. Extending from the vertical leg 48 in general perpendicular relationship thereto is a horizontal leg 50 that includes a series of spaced apart apertures 52. In operation, the preheated, pressurized air is conveyed down the vertical leg 48 of the air disperser 46 and enters the horizontal leg 50 where the air exits therefrom through the series of apertures 52. The exiting air is dispersed in, then moves up through the water W contained therein and because of the substantial air flow generated by the air injection pump 24 a vigorous, frothing, churning and boiling action is realized.

Also, secured to the openable loop 44 is a water droplet break-up screen 54 which depends downwardly therefrom and normally assumes a position between the water level and the top 44. To support the water droplet break screen, a steam 56 extends therefrom through the openable top 44.

The portion of the stem 56 extending through the openable top 44 is communicatively connected to air outlet means, indicated generally at 58, which extends from the water reservoir 34 to the top portion of the carburetor air cleaner shroud 22. Air outlet means 58 includes an air outlet tube 60 which is generally elongated and tubular in shape. As was the case in the air inlet tube 36, the air outlet tube 60 is insulated by an insulating structure of any suitable type which is indicated by the numeral 62.

As illustrated in FIG. 1, the outlet end of the air outlet means extends through a collar 64 about a central portion of the air breather cap 22 such that the water vapor WV carried thereby can be delivered directly to the top portion of the air cleaner shroud 22. It should be pointed out that the water vapor should be delivered to the areas of the carburetor 20 which are always in operation. In cases of multi-barrel carburetors it very well might be appropriate to divide the water vapor by using a series of individual tubes and to direct the divided water vapor directly into each barrel of the carburetor which is utilized during cruising conditions of normal driving.

Finally, the water vapor system of the present invention includes a controllable valve 66 interposed within the air outlet tube 60 between the carburetor 20 and the water reservoir 34. Although not particularly shown in detail, it is contemplated that this controllable valve would be of any well known type capable of diverting the water vapor WV traveling through the air outlet tube 60 to the atmosphere. As far as controlling the valve 66, it follows that any conventional form of controlling such a valve could be used. For example, the valve 66 could be manually controlled, controlled by an electric solenoid switch, or could even be controlled in response to the speed or RPM of the engine 12.

By being able to divert the water vapor WV to the atmosphere, it follows that the operator could actuate such controllable valve 66 prior to engine shut-down. This would allow only normally humidified air to enter the engine during the final stages of operation and consequently any accumulation of moisture could be purged from the engine.

With respect to FIGS. 2, 3 and 4, a second species or embodiment of the water vapor injection system of the present invention is illustrated therein and generally indicated by the numeral 70. Basically the second species incorporates an air pumping means that readily supplies a sufficient volume of air to the water injection system whereby the same may be preheated, supersaturated with water molecules and directed to an area adjacent the intake opening of the carburetor of the engine. Additionally, the second species incorporates certain alterations in the preheating apparatus whereby the forced air may be readily heated a sufficient amount, generally between 100° C. and 300° C., prior to entering the water reservoir. Furthermore, the second species, when compared to the first embodiment of the water vapor injection system, is shown to incorporate a water reservoir having internal baffles, an exteriorly disposed water level sight gauge and auxiliary water replenishing means.

Viewing the second species in greater detail, the same is illustrated in FIG. 2 to be adapted to a six cylinder engine being generally indicated by numeral 72. The widely understood embodiment of engine 72 is shown to incorporate a block 74, a carburetor and air intake filter 76 and 78, respectively, an intake manifold 80, and an exhaust manifold 82.

The embodiment of the second species incorporates two air pumps 84 and 86 which are held adjacent one end of engine 72 by brackets 88 and 90, respectively. Air pumps 84 and 86 are driven by belts 92 and 94 which are trained about a crank shaft pulley (not shown), whereby the same may drive air pumps 86 and 88 when the engine is running.

Associated with air pumps 84 and 86 are a pair of air hoses or conduits 96 and 98 which readily direct the forced air being supplied by the air pumps for use in the water injection system. A junction fitting 100 merges the individual air flows provided by the air pumps such that the same may be channeled into a singular main air hose or conduit 102. Main air hose 102 has the capacity to direct at least 25 to 35 cubic feet per minute of air, which is preferably supplied by the combined (parallel) output volumes of the air pumps 84 and 86, into the exhaust manifold preheating assembly 104 which is illustrated in FIG. 3.

Preheating assembly indicated at 104 in FIG. 3 is basically a stainless steel tube 106 that extends from junction 100 on through openings of exhaust manifold 82 whereby hot gases exiting the combustion chambers of the engine may pass about and around the tube 106 and readily heat the forced air blown through the tube to a temperature of approximately 140° C. (at idle) to 300° C. (cruising load/RPM). This extreme range of temperature variation is conducive to expansion and contraction of the tubing 106. Therefore, the tubing 106 is welded to the walls of the exhaust manifold 82 on one end with a slipped fit joint 108 being formed at the other end.

After the forced air has been preheated, it is directed via an insulated air inlet tube 110 to a water reservoir 112 whereat it will be humidified to a supersaturated state.

Water reservoir 112 (which is preferably constructed of stainless steel or other suitable material) as illustrated in FIG. 4, incorporates an air disperser 114 which is communicatively connected to air inlet tube 110 such that forced air may be directed along the bottom of the reservoir and effervesced through the water contained therein. When viewed in greater detail, it is seen that the air disperser 114 incorporates a loop trap 116 which prevents the water contained in the reservoir from draining into the air inlet tube 110 when the system is shut down. Additionally, the air disperser 114 utilizes an air effervescing extension 118 having a series of apertures 120, preferably being approximately 0.040 inches in diameter (and of sufficient number to equal at least twice the area of the inside diameter of extension 118), disposed along its lower side whereby the forced air may be directed into the water, which is contained within the reservoir and about the effervescing extension 118. Apertures 120 are circumferentially spaced as illustrated in FIG. 5, and preferably longitudinally spaced approximately 0.125 inches apart. The end of extension 118 is closed by a cap 119. A series of baffles 122, two being shown, are disposed across the water reservoir 112 and thereby minimize the movement of the water which may occur when the automobile is moving. Situated horizontally across the interior of water reservoir 112 is a screen 124 which is attached to the reservoir wall at the desired level and subsequently aids in the reduction of turbulence associated with air bubbles escaping the water while being supersaturated with water vapor. Two air baffles 126 and 128 are situated in the area above the water and readily prevent any water droplets from exiting air outlet tubes 130 and 132, which are communicatively connected to the top of water reservoir 112.

Outlet tubes 130 and 132 direct the supersaturated vapor which exits from the water reservoir 112, to an area adjacent the air intake opening of carburetor 76 in the case of the first embodiment discussed hereinabove.

Associated with the water reservoir 112 is an auxiliary water replenishing subsystem 136 which acts to maintain the water level within reservoir 112 at a predetermined level. Basically, the replenishing subsystem comprises a water supply tube 138 whose flow is controlled by a float valve 140, itself being controlled by the water level within water reservoir 112. A differential pressure line 142 is communicatively connected between the area above the water in water reservoir 112 and the float valve 140 to equalize internal pressure, thereby allowing the water level of each to be the same. The replenishing subsystem 136 is supplied water through supply line 146 by a water supply reservoir (not shown), and in virtually all cases the supply water must be demineralized by a conventional ion exchange system provided with the system. Additionally, the replenishing subsystem includes a water level sight gauge 144 to provide a means for visually determining the water level within the water reservoir 112.

In actual operation, this second embodiment of the water vapor injection system of the present invention is preferably supplied with approximately 40 to 70 cubic feet per minute of air by two air pumps 84 and 86. This forced air flow is then directed through the preheating assembly 104 whereat the temperature of the same is raised from that of ambient air to preferably around 300° C., and generally at least to 100° C. Air inlet line 110 directs the preheated air to the water reservoir 112 whereat the inlet tube is communicatively connected to an air disperser 114 disposed within the water reservoir. The forced air is expelled into the water of the reservoir through apertures 120 which are disposed along the lower portion of effervescing extension 118. The heated air bubbles rise through the water and readily vaporize the same about the interface between the air bubbles and the surrounding water. The supersaturated vapor is forced through outlet tubes 130 and 132 after passing about baffles 126 and 128 located in the uppermost area of water reservoir 112. These air baffles tend to retard large droplets from being carried out outlet tubes 130 and 132 by the escaping moisture-laden air. The outlet tubes duct the moisture-laden air flow, which is now cooled to approximately 28° to 30° C., such that the same is introduced within the confines of the filtering element of air filter 78 and the air flow is exhausted adjacent the intake opening of carburetor 76.

Prior to shut down of the engine, a control valve 150 (FIG. 3) is actuated, thereby venting the forced air into the atmosphere prior to its entry into the preheating assembly water reservoir. This by-pass of the water vapor injection system allows for only normally humid air to be drawn into the carburetor opening, thereby purging the engine. The actuation of control valve 150 may be performed either mechanically or electrically by the operator of the motor vehicle. In any event, the valve acts to divert the forced air from inlet tube 110 into the atmosphere via duct 152.

The rate of water consumption by the water vapor injection system can be expected to be 25 to 100 percent of fuel consumption, but is dependent upon engine operating loads and speeds, yet is always sufficient to necessitate constant replenishment. The second species of the present invention therefore incorporates a water replenishing subsystem 136 which maintains the water level of the water reservoir at a predetermined level. This is accomplished by utilizing commonly used float valve, as shown in FIG. 2, having a pressure equalizing tube 142, a supply tube 138 for filling the water reservoir, and a supply line 146 which supplies water to the subsystem from a water supply/pump.

EFFECT OF THE WATER VAPOR INJECTION SYSTEM ON THE COMBUSTION PROCESS

The inducement of water vapor into the combustion chambers or cylinders of an internal combustion engine basically affects the combustion process and increases the efficiency thereof.

More particularly, a very high water content within the air, when mixed with a fuel (solid, liquid, or ir-fuel mixture tends to slow down and smooth out the flame front which provides a longer burning time during the combustion phase of the cycle, thus giving rise to a smoother operating engine. It is this slowing down of the flame front that yields a more complete combustion of the fuel charge within the combustion chamber, thus reducing the unburned hydrocarbons emitted to the atmosphere (HC).

It consequently follows that the water vapor injection system of the present invention gives rise to a smooth operating and economical engine, while at the same time having a positive and beneficial effect on controlling emissions, along with greater over-all reliability and longevity.

In addition, it will be appreciated that the water vapor injection system of the present invention can be effectively utilized in other types of power plants besides those of the internal combustion type.

Referring back to the water vapor injection system described earlier, it is appreciated that by preheating the air prior to exposing the same to the water in reservoir 34, the vaporization characteristics of the air are altered and it is this different approach to the vaporization of water that increases the overall efficiency of the water vapor system and the combustion process of the engine used in conjunction therewith.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A process of generating and injecting water vapor into an air-fuel mixture passing from a carburetor of a combustion engine comprising:
   (a) forcing ambient air into and through an air inlet means;
   (b) preheating said ambient air to at least 100° C. while the same is being forced through said air inlet means;
   (c) directing the forced heated air from said air inlet means directly into a volume of water contained in a water container wherein moisture becomes associated with the air moving through the water as an evenly dispersed foaming action is realized as the forced heated air moves through the volume of water;
   (d) continuing to force the cooled moistened air from said water vapor container through an air outlet means;
   (e) directing the moistened air in said air outlet means to said engine carburetor and discharging the moistened air directly into the air intake area of said engine carburetor; and
   (f) mixing said moistened air with the air-fuel mixture passing through the engine carburetor prior to the combined mixture reaching the engine intake manifold.

2. The process of claim 1 wherein directing the forced heated air from said air inlet means directly into the volume of water contained in a water container includes vaporizing water about the interface between the heated air and the surrounding water, resulting in water molecules being combined with the passing air.

3. A water vapor injection system for adding moist air to the air-fuel mixture passing through a carburetor into the combustion chamber of an engine, said water vapor system comprising: a water container means completely independent of the engine and engine cooling system adapted to contain a volume of water therein for moistening air being passed therethrough prior to reaching said engine; an air inlet means operatively connected to said water container means, and including interior air inlet means extending interiorly of said container means and having air exit opening means disposed at a position below the normal level of the water in said container means; an air pump means operatively connected to said air inlet means for forcing ambient air therethrough and into said water container means and out said air exit opening means and through said volume of water within said container means, such that an evenly dispersed foaming action is realized as the forced air moves through the water in said water container means and the air becomes moistened air in the process; means for heating the forced air generated by said pump means to at least 100° C. prior to entering said water container means in order that the heated air passing through the water as air bubbles may act to vaporize water about the interface between the heated air bubbles and the surrounding water; and an air outlet means operatively connected between said water container means and the carburetor intake area of said engine for receiving the moistened air leaving said water container means and delivering the same to the carburetor of said engine where said moistened air mixes with the air-fuel mixture passing from the carburetor into the combination chambers of said engine.

4. The water vapor injection system of claim 3 wherein said means for heating the forced air includes an exhaust manifold associated with said engine, and wherein said air inlet means is directed through said exhaust manifold to form a heat exchanger wherein heat associated with the exhaust gases is transferred to air passing through said air inlet means.

5. The water vapor injection system of claim 4 wherein said water container means includes a series of spaced apart vertical baffles extending across the bottom portion of said water container for minimizing the surging of the water during operation; and wherein said interior air inlet means is looped in an elevational fashion to prevent water from draining from the water container into said air inlet means.

6. The water vapor injection system of claim 5 wherein said water container includes upper baffle means disposed about the top thereof.

7. The water vapor injection system of claim 3 wherein said water vapor injection system further includes means for automatically replenishing water as the water is vaporized in said water container means by controlling the flow of water from a water supply to said water container means in response to the effective water level change in said water container.

8. The water vapor injection system of claim 6 wherein said water container means is provided with a generally horizontal screen disposed above said baffles disposed in the lower portion of said water container means to generally diffuse any water and/or air bubbles passing therethrough.

9. The water vapor injection system of claim 3 wherein said water vapor injection system is provided with control means for effectively stopping the flow of moistened air into said carburetor prior to engine shut down.

10. The water vapor injection system of claim 9 wherein said control means includes valve means interconnected in said air inlet means between said air pump means and said means for heating the air passing in said air inlet means in order that the air generated by said air pump means can be diverted from said air inlet means prior to the air reaching said heating means, such that the flow of heated air through said water container means and into the carburetor can be stopped prior to engine shut-down.

* * * * *

UNITED STATES PATENT AND TRADEMARK OFFICE
CERTIFICATE OF CORRECTION

PATENT NO. : 4,208,989
DATED : June 24, 1980
INVENTOR(S) : Radford H. Hart

It is certified that error appears in the above—identified patent and that said Letters Patent is hereby corrected as shown below:

Column 1, line 33, "harnassed" should read -- harnessed --.
Column 6, line 67, "slipped fit" should read --slip fit --.
Column 7, line 35, "vapor" should read -- molecules --.
Column 8, line 31, "110" should read -- 102 --.
Column 8, lines 53 through 62 should read:

--More particularly, a very high water content within the air, when mixed with a fuel (solid, liquid, or gaseous) containing carbon initiates, upon combustion, an endothermic chemical reaction, consuming a substantial

UNITED STATES PATENT AND TRADEMARK OFFICE
CERTIFICATE OF CORRECTION

PATENT NO. : 4,208,989
DATED : June 24, 1980
INVENTOR(S) : Radford H. Hart

It is certified that error appears in the above—identified patent and that said Letters Patent is hereby corrected as shown below:

amount of heat, as well as liberating the hydrogen within the water. This reaction is well known as the water gas reaction, and is responsible for the reduction of the oxides of nitrogen ($NO_x$) and the conversion of carbon monoxide (CO) to carbon dioxide ($CO_2$), along with the consumption of any residual carbon which may tend to be deposited on surfaces. The hydrogen liberated is merely a supplemental fuel, and the increase in useable power yields an increase in fuel economy.--

Signed and Sealed this

Twenty-first Day of October 1980

[SEAL]

Attest:

SIDNEY A. DIAMOND

Attesting Officer

Commissioner of Patents and Trademarks